United States Patent [19]

Bennett et al.

[11] Patent Number: 5,852,747
[45] Date of Patent: Dec. 22, 1998

[54] SYSTEM FOR AWARDING TOKEN TO CLIENT FOR ACCESSING FIRST DATA BLOCK SPECIFIED IN CLIENT REQUEST WITHOUT INTERFERENCE DUE TO CONTENTION FROM OTHER CLIENT

[75] Inventors: Robert Bradley Bennett, Endwell; Eugene Johnson, Vestal; Terrence L. Woodnorth, Endicott, all of N.Y.

[73] Assignee: International Business Machines Corporation, Armonk, N.Y.

[21] Appl. No.: 525,991
[22] Filed: Sep. 8, 1995
[51] Int. Cl.$^6$ ..................................................... G06F 13/14
[52] U.S. Cl. ............................................. 395/860; 395/726
[58] Field of Search ..................................... 395/250, 800, 395/600, 427, 440, 608, 860, 720

[56] References Cited

U.S. PATENT DOCUMENTS

| | | | |
|---|---|---|---|
| 4,849,878 | 7/1989 | Roy | 707/200 |
| 4,881,164 | 11/1989 | Hailpern et al. | 711/207 |
| 4,887,204 | 12/1989 | Johnson et al. | 707/10 |
| 5,117,486 | 5/1992 | Clark et al. | 395/250 |
| 5,134,712 | 7/1992 | Yamamoto | 395/800 |
| 5,175,851 | 12/1992 | Johnson et al. | 707/8 |
| 5,218,695 | 6/1993 | Noveck et al. | 707/205 |
| 5,305,440 | 4/1994 | Morgan et al. | 395/200.33 |
| 5,317,746 | 5/1994 | Watanabe | 395/186 |
| 5,367,698 | 11/1994 | Webber et al. | 395/200.33 |
| 5,404,511 | 4/1995 | Notarianni | 395/600 |
| 5,555,388 | 9/1996 | Shaughnessy | 395/427 |
| 5,557,767 | 9/1996 | Sukegawa | 395/440 |
| 5,623,659 | 4/1997 | Shi et al. | 395/608 |
| 5,634,122 | 5/1997 | Loucks et al. | 395/608 |

OTHER PUBLICATIONS

IBM TDB vol. 31, No. 8, 1/89, "Method for Managing Client/Server Relationships in the AIX Operating System", pp. 195–198, by Johnson et al.

IBM TDB vol. 31, No. 11, 4/89, File Synchronization Modes (S Modes), pp. 275–280, by Shaheen–Gouda et al.

IBM TDB vol. 34, No. 7A, 12/91, "Maintaining Data Consistency in a Distributed Data Processing System", pp. 178–181, by Chang et al.

IBM TDB vol. 34, No. 7B, 12/91, "Dynamic Linking in the System/370 And System/390 Architectures", pp. 82–86, by Ewart et al.

IBM TDB vol. 37, No. 11, 11/94, "Efficient Representation of Page/Range Tokens in a Binary Tree Data Structure", pp. 397–398, by Mohindra.

Primary Examiner—Thomas C. Lee
Assistant Examiner—David Ton
Attorney, Agent, or Firm—Ratner & Prestia; Arthur J. Samodovitz

[57] ABSTRACT

A client/server computer system manages shared files. A client includes a data cache and an associated cache manager, and executes a client application that requests data from a shared file. In response to the request, the client cache manager determines if the data is currently stored in the data cache, and if so, grants the client access to the data in the cache. However, if the data is not currently stored in the cache, the client cache manager sends to the server a request for multiple consecutive blocks of data beginning with the first block containing the data requested by the client from the shared file. The server includes a token manager which receives the request, and in response (a) awards the token for a first data block specified in the request regardless of contention for the first data block and (b) awards tokens for all other consecutive blocks following the first block of the multiple blocks held by a client who also holds the token for the first block. However, if another client currently holds a contending token for one of the consecutive blocks other than the first block but does not also hold the token for the first block, then the token management process awards only the tokens for the first block and all blocks between the first block and the one block.

19 Claims, 13 Drawing Sheets

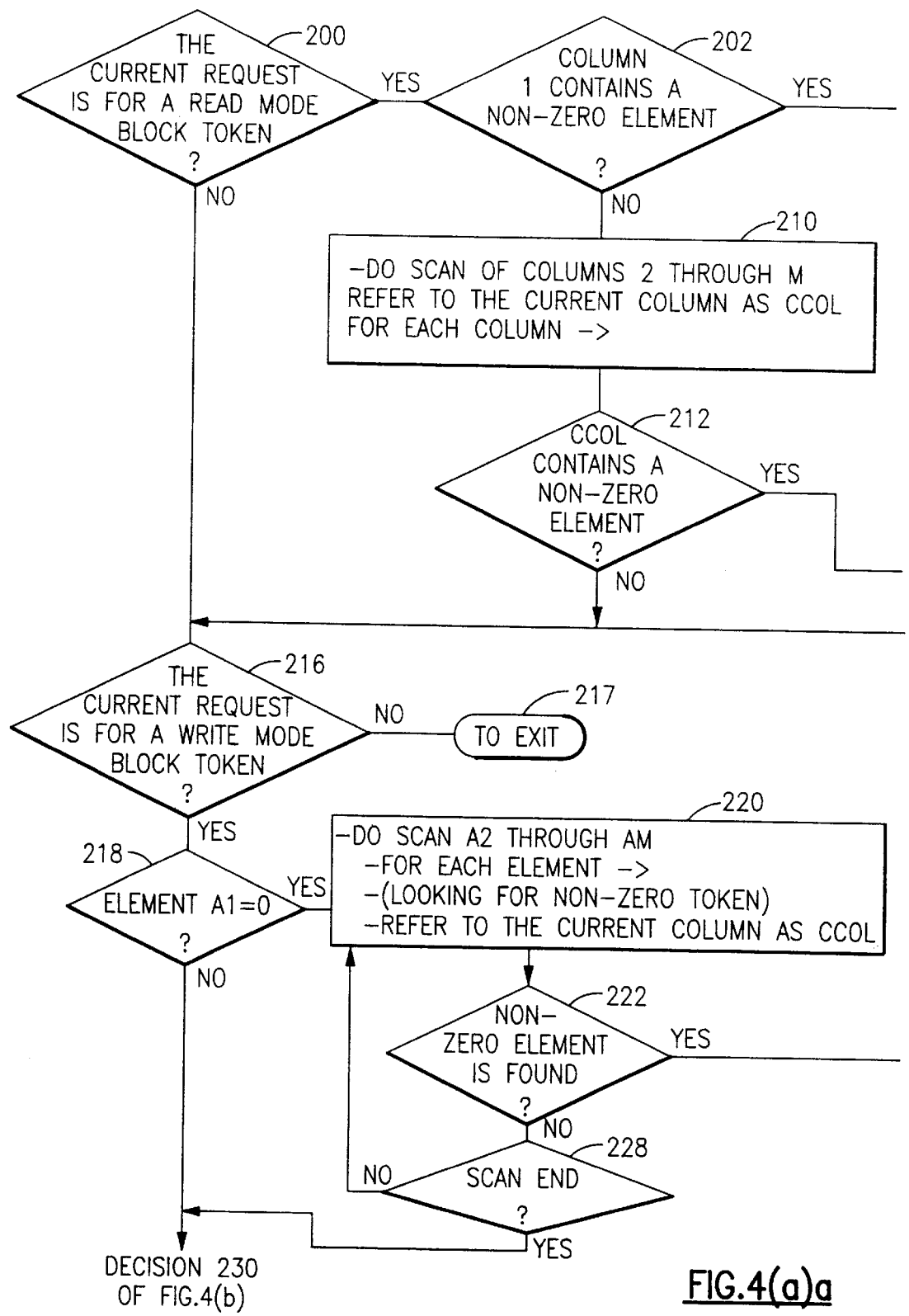
FIG.4(a)a

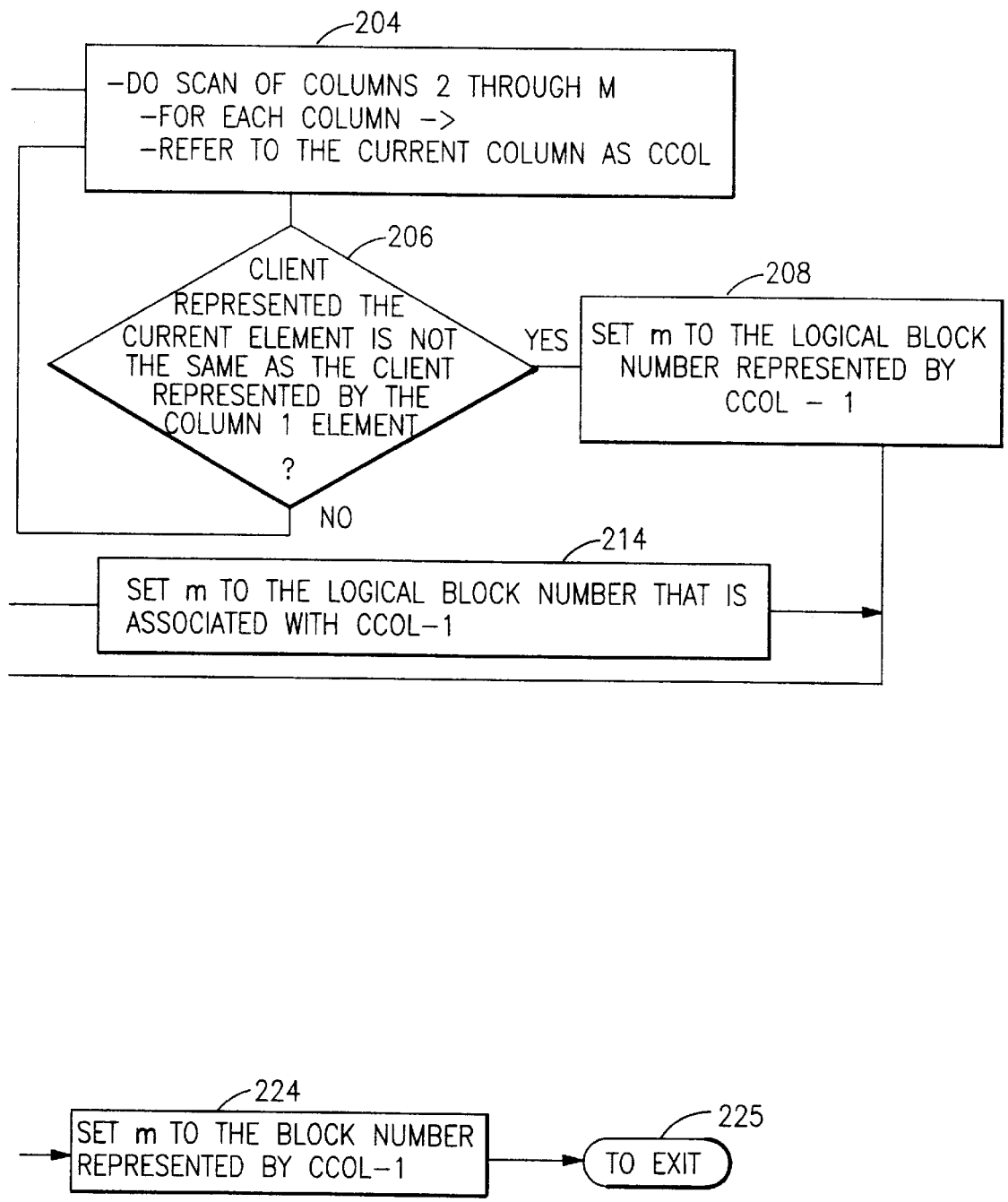
FIG.4(a)b        FIG.4(a)

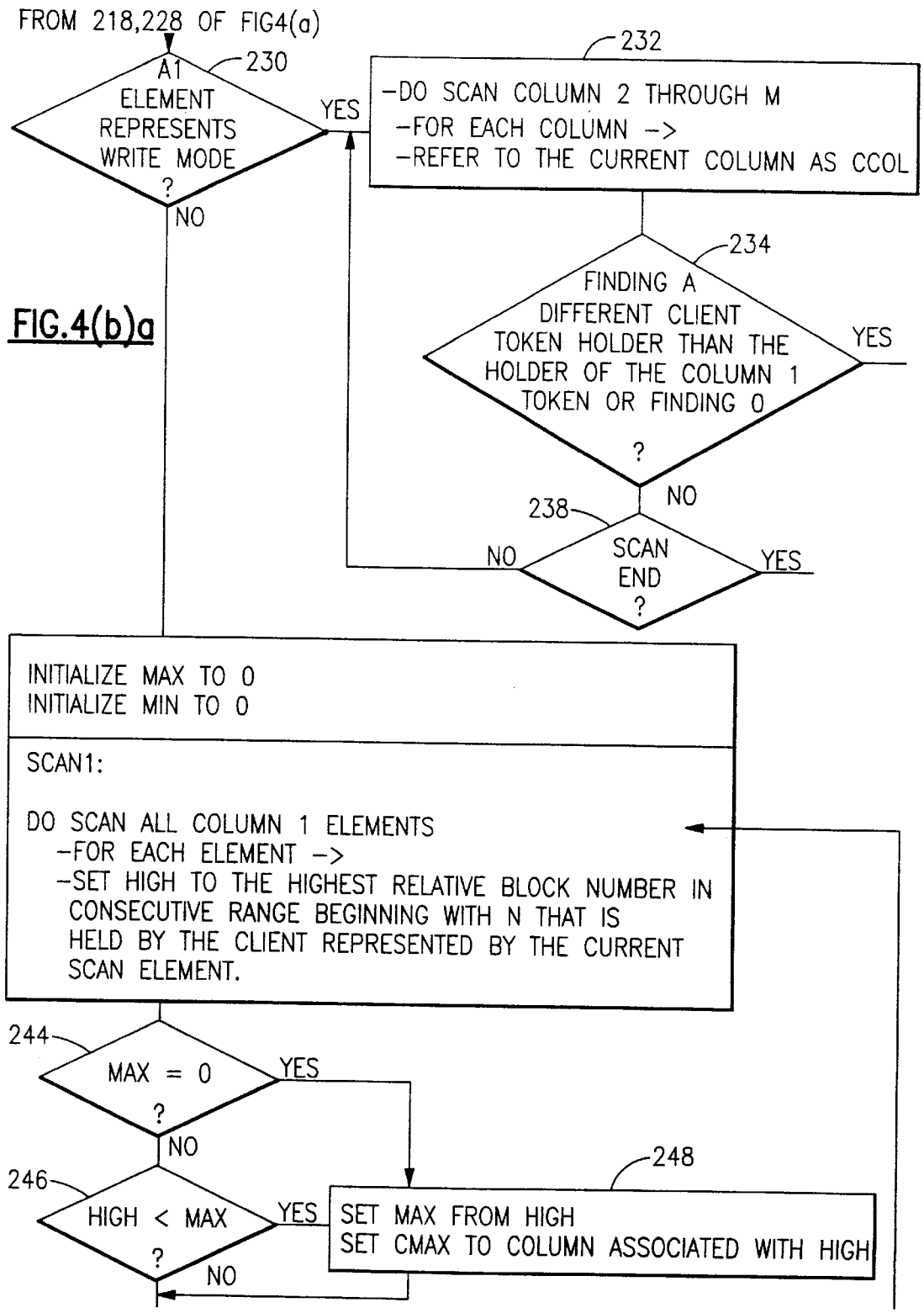

FIG.4(b)b

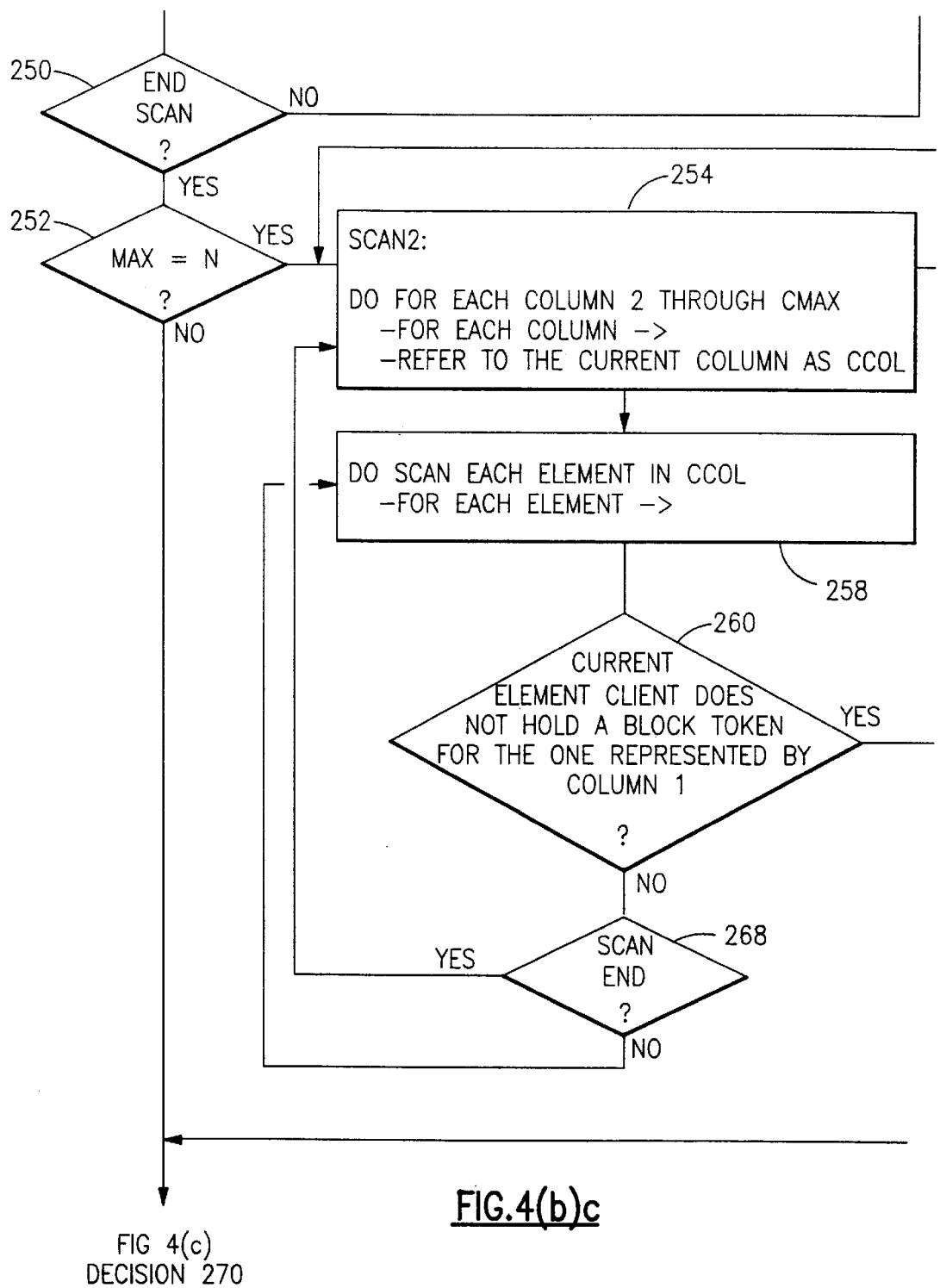
FIG.4(b)c

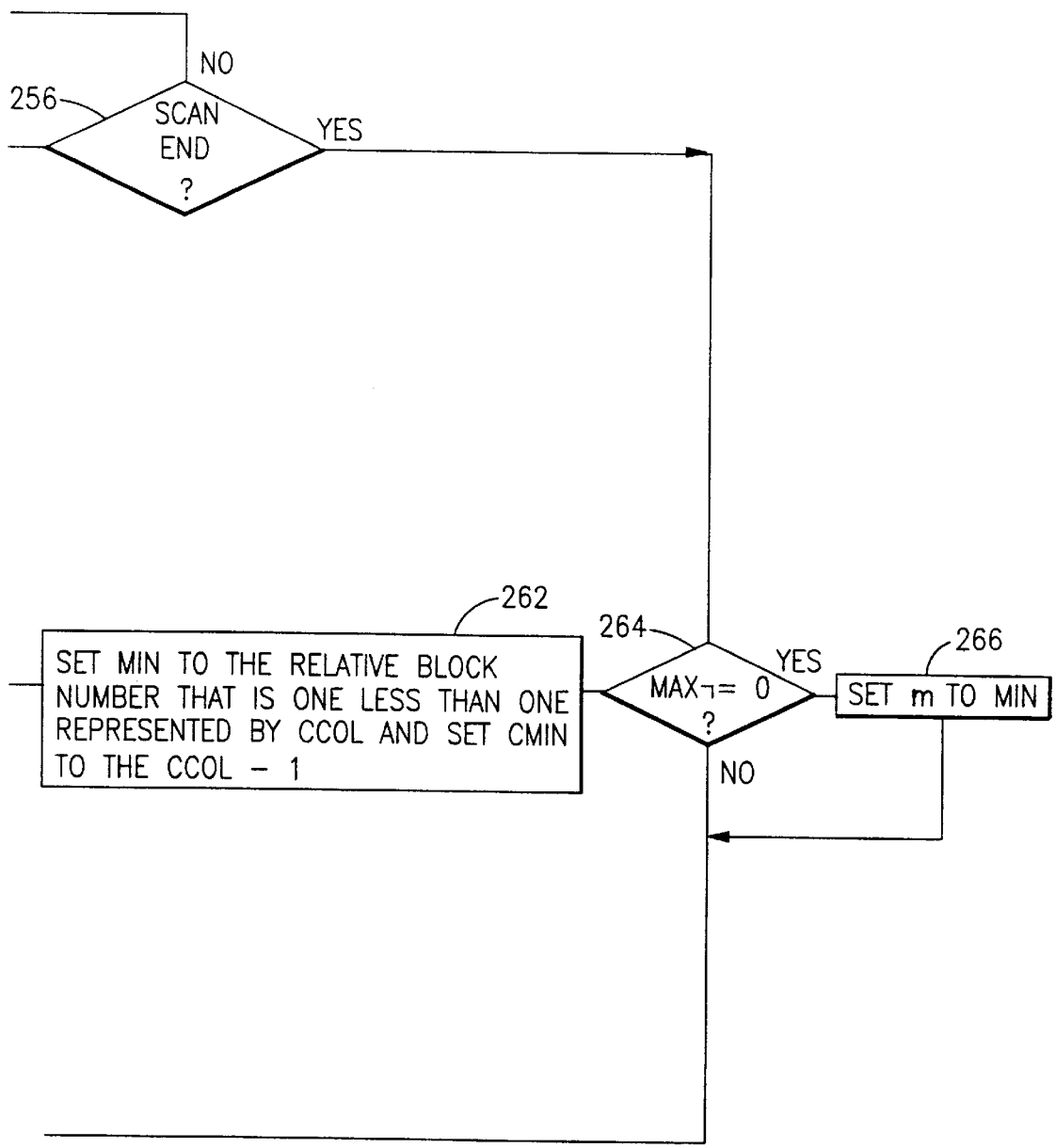
FIG.4(b)d

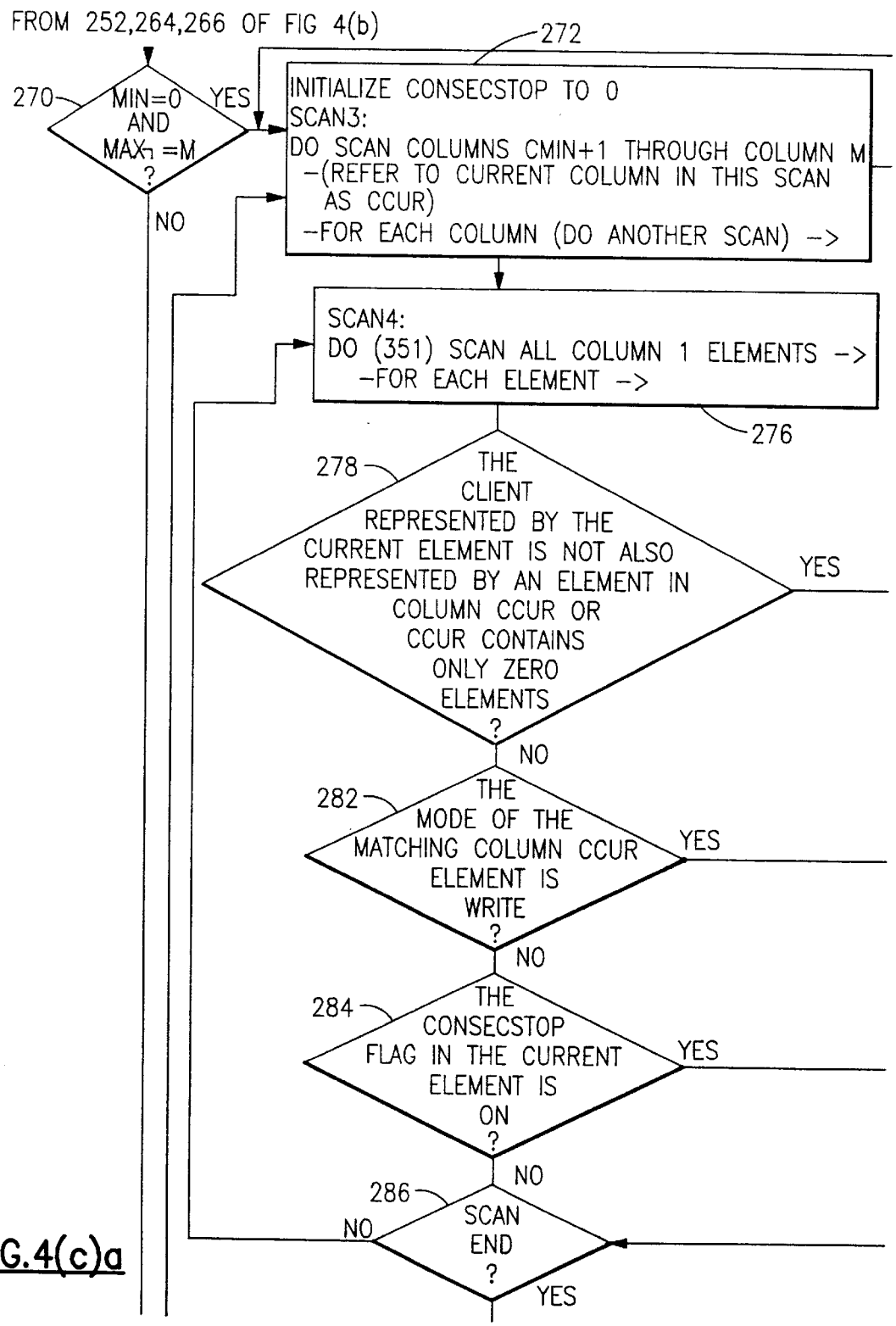
FIG.4(c)a

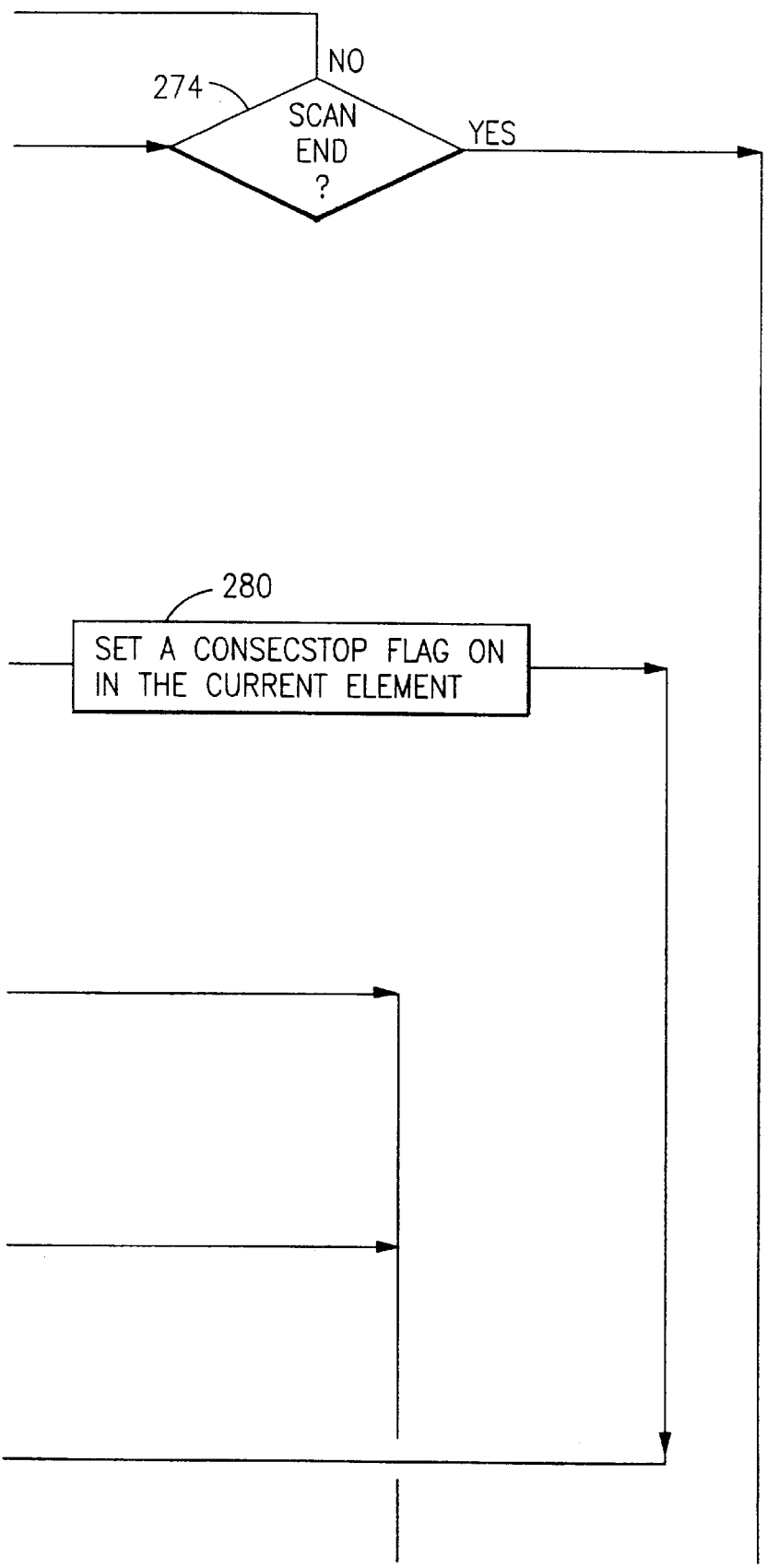
FIG.4(c)b

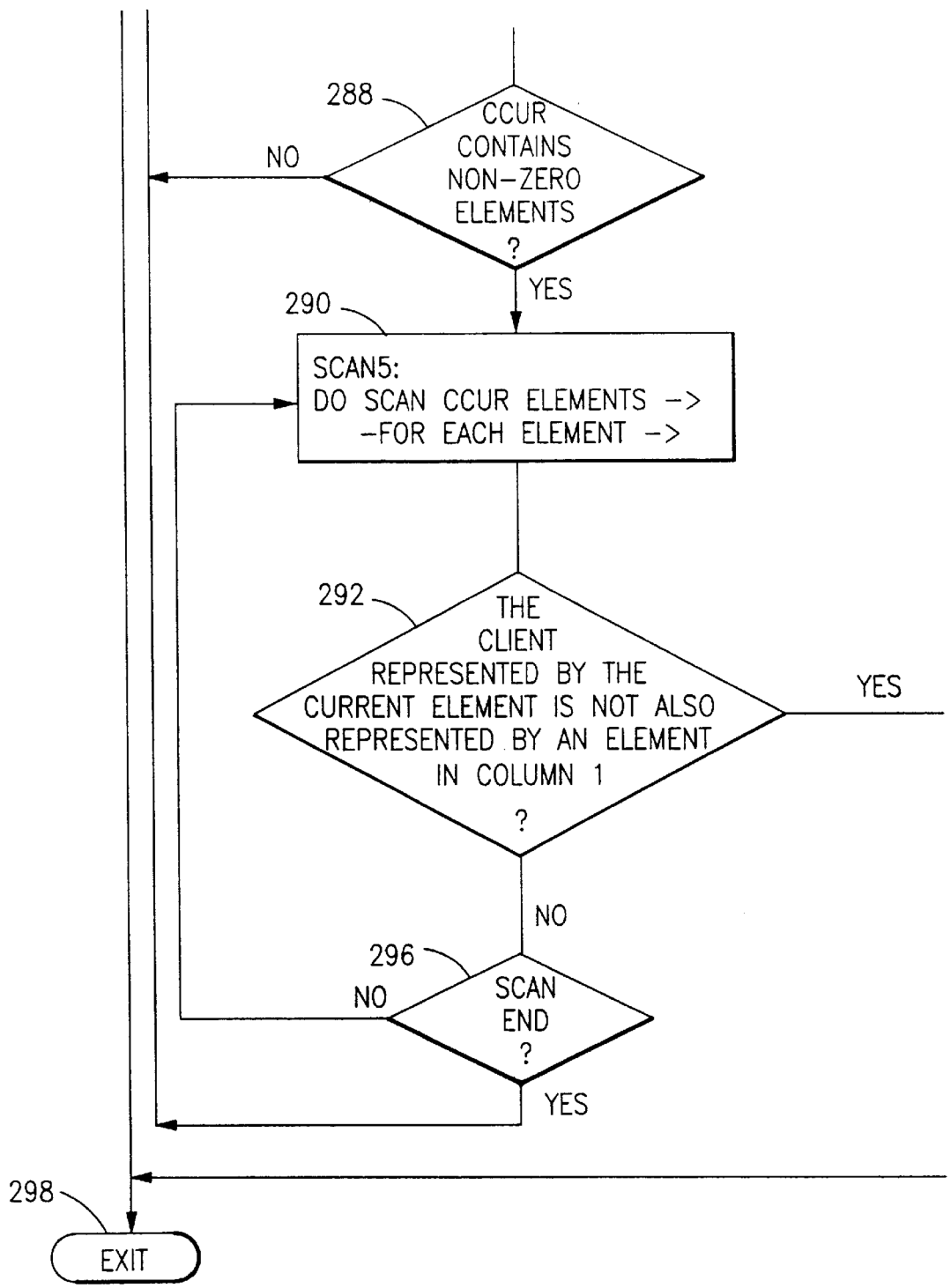
FIG.4(c)c

FIG.4(c)d

SYSTEM FOR AWARDING TOKEN TO CLIENT FOR ACCESSING FIRST DATA BLOCK SPECIFIED IN CLIENT REQUEST WITHOUT INTERFERENCE DUE TO CONTENTION FROM OTHER CLIENT

BACKGROUND OF THE PRESENT INVENTION

The present invention relates generally to file management in a client/server computer system, and deals more particularly with read ahead cache optimizations to minimize the number of communications required between the client and the server to obtain access by the client to blocks of a shared file managed by the server.

Many types of client/server computer networks are well known, and typically involve a multiplicity of clients in the form of workstations and associated applications, a server in the form of a workstation or main frame computer and a network in the form of wiring, hardware and software to interconnect the clients to the server. The server typically provides a variety of services to the clients, such as storage and management of large files for each client and storage and management of files shared by more than one client. A "file" may comprise actual data and control information such as size, type, date of last change, etc. of the actual data. The control information is also known as "metadata".

There are a variety of known techniques to manage shared files. According to one technique, a requester may obtain a lock on a shared file if the file is available. The lock may be exclusive, shared, or some combination of shared and exclusive control based on whether the owner has locked the file for reading or writing and whether the subsequent requester requires read or write access. In any case, this type of system reserves the lock for the owner until the owner relinquishes the lock or some other unusual occurs such as a deadlock, time out, system abend, etc.

Another shared file management technique in accordance with an Open Software Foundation product called Distributed File Service, permits a new requestor to quickly obtain access to shared files at the expense of a current user. According to this system, the server associates a "token" with each sixteen 4K blocks (a "chunk") of data or metadata. When a new client requests a block for writing, if the token is not currently "checked-out" to another client for the chunk, the server immediately furnishes an identification of the block to the client. The server also records that this new client currently has the token for this chunk and that this client has requested the block for write. The new client then requests the actual data block associated with the token, and the server complies. However, if the token was checked-out to another client when requested by this new client, the server issues a "call back" to this other client. According to convention, this other client is obligated to return any file updates and control of the chunk as soon as this other client completes its current atomic operation, such as a single read, write, file open, file close, create file or directory or delete file or directory operation. After the call back, the server proceeds as noted above—the server furnishes the block identification to the new client and records that this new client currently owns the token and that the ownership is for write. Next, this new client requests the actual data block and the server complies.

The Distributed File Service permits multiple concurrent readers. Therefore, if this new client instead requested the block for read and the token is not currently checked-out or is currently checked-out for read only, then the server will provide the block identification and record that this new client has checked-out the block for read. Also, upon request by this new client, the server will furnish the block. However, if this new client requested the block for read and if the token is currently checked-out to another client for write, then the server will issue a "call back" to this other client. According to convention, this other client is obligated to return any file updates and control of the block as soon as this other client completes its current atomic operation. Then, the server furnishes the block identification to the new client and records that this new client currently owns the token and that the ownership is for read. Next, this new client requests the actual data block and the server complies.

Some types of client/server systems use the principal of "caching" for nonshared files or shared files controlled by locks. According to the principal of caching, a requested block and other subsequent blocks are fetched together for the client in a bulk transfer. This is done with the expectation that these other subsequent blocks will soon be needed by the application. The rationale is that the mass transfer of the multiple blocks requires less message traffic between the client and server than separate transfers for each block. Thus, if there is a high probability that these subsequent blocks will be needed shortly, the mass transfer will be more efficient than multiple transfer of individual blocks. For example, the client includes buffers to store four 4K byte blocks, and if a client application requests the first 4K byte block, the server will provide the first four 4K byte blocks from the file. All four 4K byte blocks are then stored in the client's buffer. If the client needs bytes beyond the initially requested single 4K block, the client need not ask the server again. Instead, the client merely fetches the additional bytes from the client's buffer, and this is much quicker and efficient than asking the server again.

While the foregoing caching technique is effective in reducing message traffic between the client and server, improvements are desired to tailor the caching strategy to the current situation and adapt to a "token" environment.

Accordingly, a general object of the present invention is to provide a read ahead caching system that is tailored to the current situation and adapted for a token environment.

A more specific object of the present invention is to provide a read ahead caching system of the foregoing type which determines how many and which blocks to furnish to a client upon request for a single block (or part thereof) or multiple blocks when other clients currently hold contending tokens for the requested block(s) or subsequent blocks.

SUMMARY OF THE INVENTION

The invention resides in a client/server computer system for managing shared files. A client includes a data buffer or cache and an associated cache manager, and executes a client application that requests data from a shared file. In response to the request, the client cache manager determines if the data is currently stored in the data cache, and if so, grants the client access to the data in the cache. However, if the data is not currently stored in the cache, the client cache manager sends to the server a request for multiple consecutive blocks of data including the data requested by the client from the shared file.

The server includes a token manager which receives the request, and in response implements a process to determine which of the requested multiple blocks should be awared to the client. The token management process (a) awards the token for a first data block specified in the request regardless of contention for the first data block and (b) awards tokens for all other consecutive blocks following the first block of the multiple blocks held by a client who also holds the token for the first block. However, if another client currently holds a contending token for one of the consecutive blocks other than the first block but does not also hold the token for the first block, then the token management process awards only the tokens for the first block and all blocks between the first block and the one block. Also, the token management process awards the tokens for all of the multiple consecutive blocks if there is no contention for all of the multiple consecutive blocks.

DETAILED DESCRIPTION OF THE PREFERRED EMBODIMENTS

Figure 1:
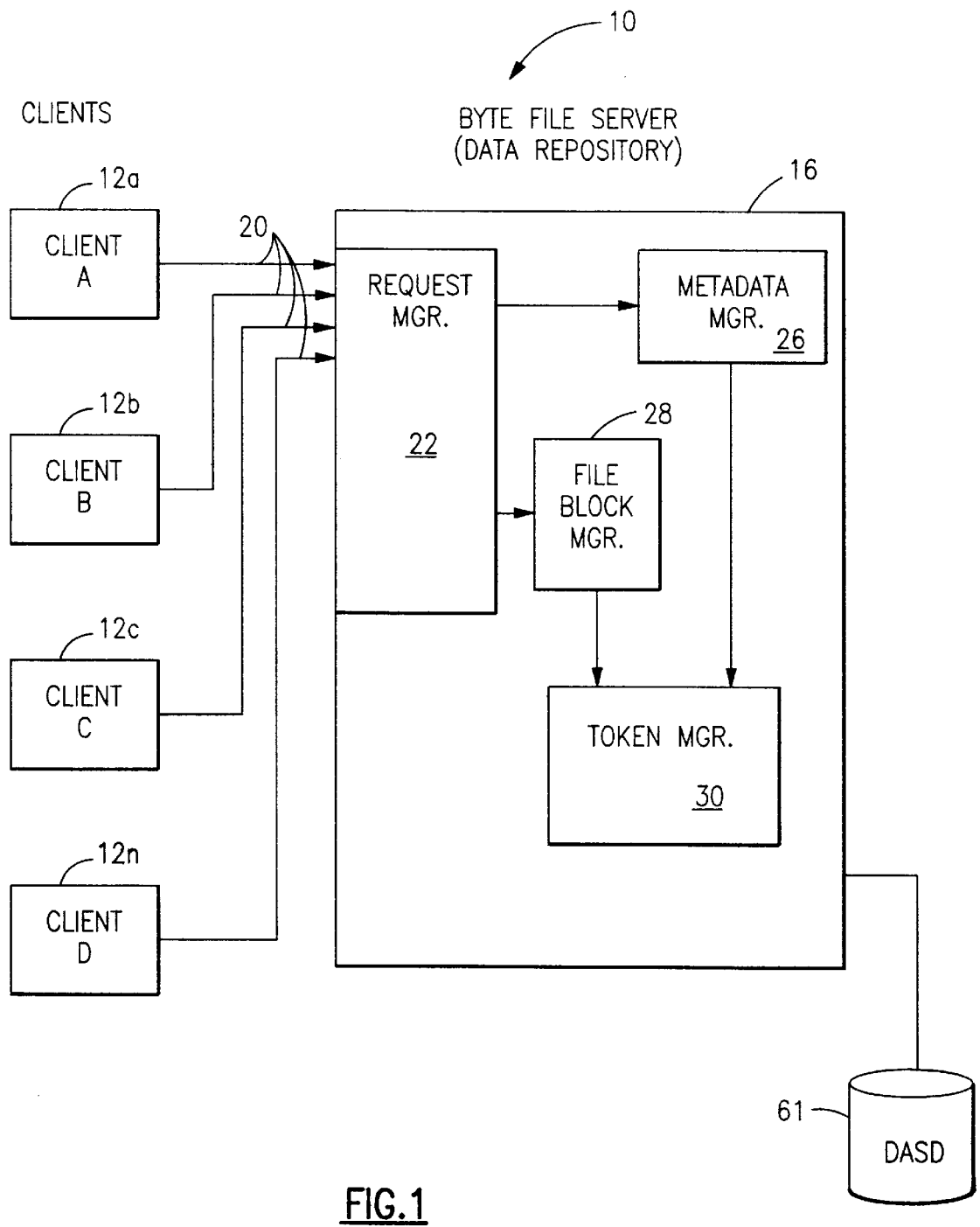
FIG. 1 is a block diagram of a client/server computer system according to the present invention.

Referring now to the Figures in detail wherein like reference numbers indicate like elements throughout, FIG. 1 illustrates a computer system generally designated 10 according to the present invention. System 10 comprises a multiplicity of clients 12a,b,c . . . N and associated applications, a server 16 and a network 20. In one embodiment, the multiplicity of clients 12a,b,c . . . N are workstations and associated applications, the server 16 is a workstation or main frame computer and the network 20 is wiring, hardware and software to interconnect the clients to the server. In another embodiment, the multiplicity of clients are virtual machines within a single main frame computer, the server is another virtual machine in the same computer and the "network" comprises internal communication facilities within the same computer. In a variation of this other embodiment, the server virtual machine resides in a different computer than the client virtual machines, and the "network" includes the communication facilities between the different computers. A "virtual machine" is a logical division of the main frame computer to divide processor time, memory and other computer resources amongst the virtual machines. Each virtual machine appears to the user to be a real machine dedicated to the user and can execute user applications (although there may be some apparent delays in responding to user requests when the real processor is occupied with requests from other virtual machines).

The server 16 provides a variety of services to the clients, such as storage and management of files shared by more than one client. A "file" comprises actual data and metadata—control information such as size, type, date of last change, etc. of the actual data. The server 16 comprises a request manager 22 for administrative handling of requests from the clients 12, a metadata manager 26 for storing and retrieving metadata pursuant to requests passed from the request manager 22, a file block manager 28 for storing and retrieving blocks of actual data pursuant to requests passed from the request manager, and a token manager 30 for awarding and recording tokens for each block and ownership thereof and performing call backs. The token manager 30 receives requests for and records ownership of tokens for the entire computer system 10 to reserve a data block to a client for update until requested by another client, prevent simultaneous updates of a data block by different clients and manage call backs.

Figure 2:
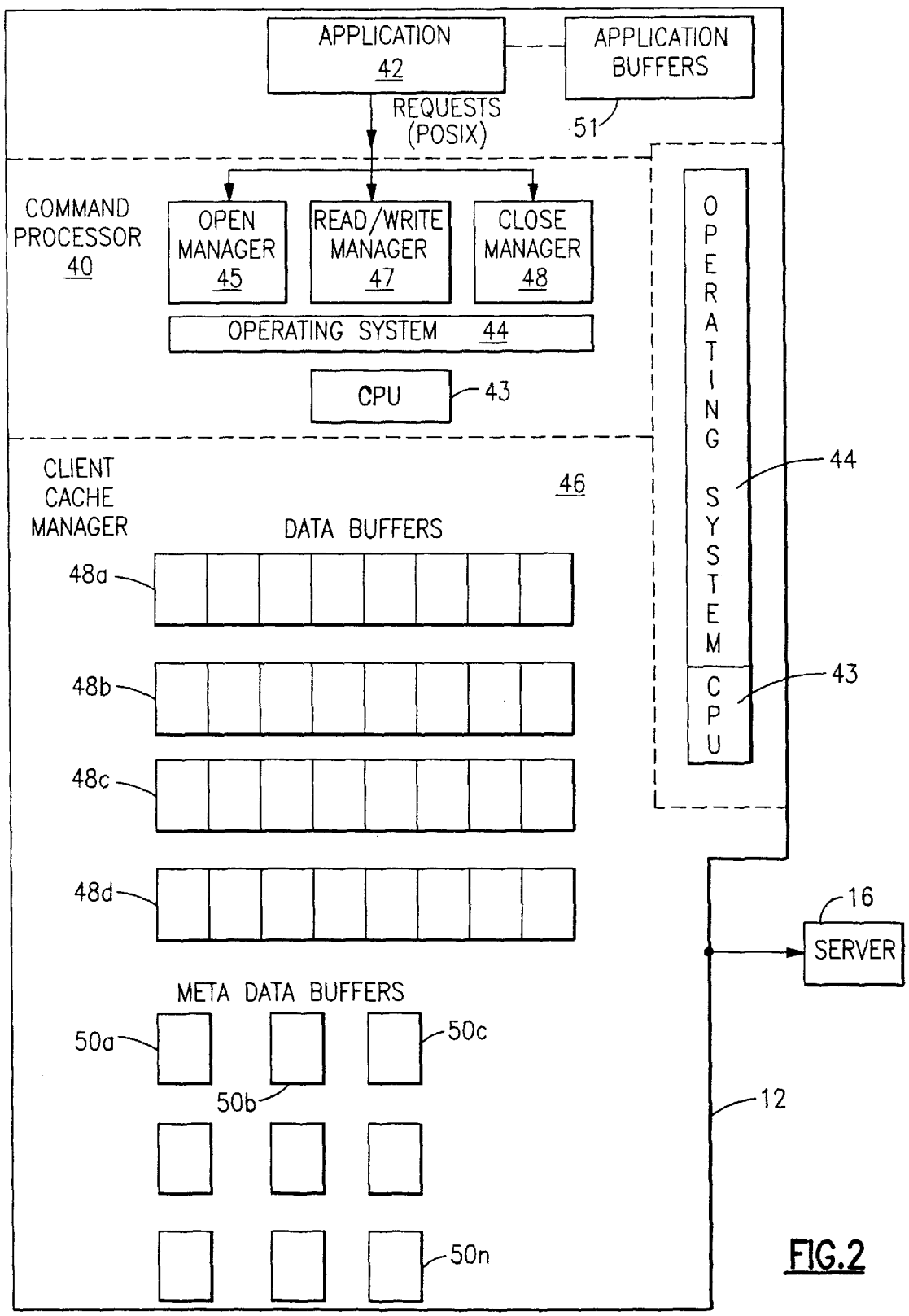
FIG. 2 is a more detailed block diagram of a client of the computer system of FIG. 1.

Each of the clients 12a,b,c . . . N is illustrated in more detail in FIG. 2, and comprises at least one client application 42, a command processor 40, a client cache manager 46, a real processor 43 and an operating system 44. The command processor includes various client functions such an open manager 45, a read/write manager 47 and a close manager 48. The application 42 requests to open a file, read/write the file and close the file. The protocol and interface between the client application and the command processor conform to an IEEE POSIX standard. The client cache manager 46 manages and includes data buffers 48a,b,c . . . N, which in the illustrated embodiment comprise four sets of eight buffers each. The client cache manager 46 also manages and includes metadata buffers 50a,b,c . . . N, which in the illustrated embodiment total nine. By way of example, each of the data buffers and metadata buffers holds 4K bytes. While all the metadata for a file fits within one metadata buffer, typically only a small fraction of a file fits within one data buffer.

To begin a file access, application 42 requests to open the desired file. The command processor 40 receives the request, and in response, the command processor requests the server to open the file and return all the metadata associated with the file. (There is a token associated with the metadata, but the metadata is always fetched as a whole. The metadata is not divided into blocks and there is no read ahead associated with the metadata. If there is contention for the token, then a callback is issued. In response, the contending client will send back any updates and relinquish control of the metadata after completing its current atomic operation.) The metadata includes the file identification, file size, file type, date of last change, etc. and is read into one of the metadata buffers 50a–N. Finally, the command processor returns to the application an identifier (file descriptor) to be used by the application on subsequent read or write requests.

Figure 3:
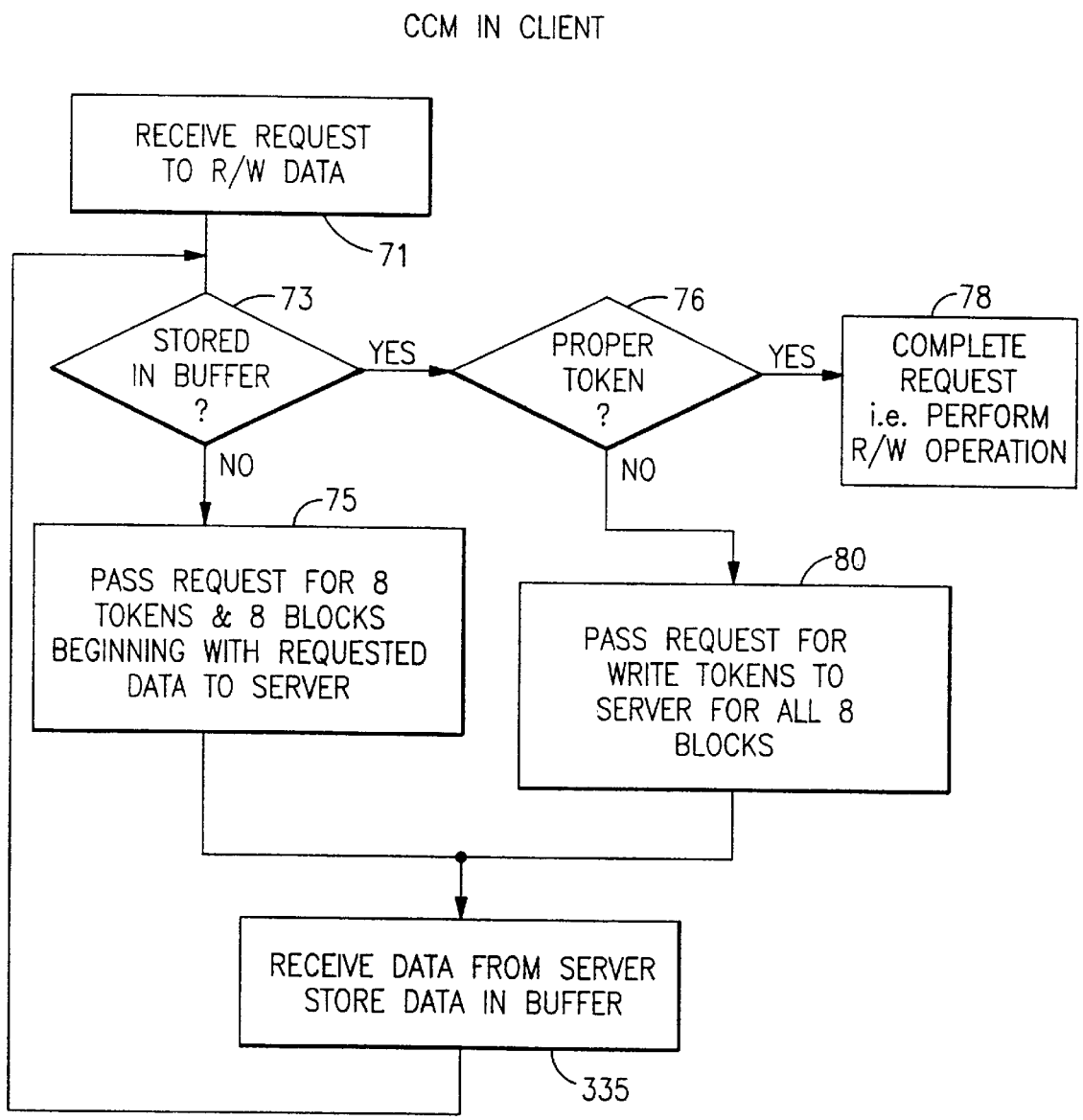
FIG. 3 is a flow chart of a process implemented by a client cache manager within the client of FIGS. 1 and 2.

After opening the file, the client application 42 may request to read or write specific bytes of actual data in a specified file. The client application references the bytes relative to the beginning of the file. For example, the client application may request the first 1K bytes of the file, and specify the location of an application buffer to receive these bytes for reading or supply the bytes for writing. In response, the command processor 40 determines which logical 4K byte block(s) contains the requested bytes, for example, the first 4K byte block. This determination is based on a simple division of the file length into 4K blocks and calculating in which block(s) the requested byte range falls. Next, the command processor asks the client cache manager 46 if the data buffers currently contain the requisite block(s) (step 71 of FIG. 3). If not (decision 73), then the client cache manager asks the server for a total of eight blocks beginning with the first requisite block (step 75). (The eight block request size corresponds to the eight block sets of buffers 48a–d in the client cache manager. However, if desired, the buffer and request size can be the same size as each other but different than eight blocks, or the requested size can be smaller than the buffer size and the buffer size can be smaller or larger than eight.) (The client cache manager asks the server for eight blocks when the requisite blocks number eight or fewer because the client cache manager logically divides its buffers into sets of eight blocks each. If the requisite blocks exceed eight blocks, then the client cache manager requests the smallest multiple of eight blocks that will satisfy the request.) In many cases, one or two blocks will satisfy the byte range requested by the client, but the client cache manager also requests the succeeding six or seven blocks with the expectation that the client will soon need them also.

The request manager 22 receives the data request from the client cache manager and routes it to the file block manager 28. The file block manager realizes that a token is required and then passes the request to the token manager 30 to obtain token(s). In accordance with the present invention, the token manager 30 makes the final decision as to how many and which tokens to award to and how many and which respective blocks to return to a client upon request for the eight multiple blocks specified in the command processor request. To this end, the token manager 30 analyzes the nature (read or write) of the request, which tokens/blocks within the span of the request are currently checked-out to other clients, and the nature of the tokens currently checked-out to the other clients. The analysis is based on a token management process described below. After determining which blocks to award to the current requester, the token manager issues the call backs, if any, required to supply these blocks to the client. Then, the token manager 30 notifies the file block manager 28 of the award of tokens to the client, and the file block manager fetches the awarded blocks from DASD 61 and then passes the awarded blocks to the client cache manager. The client cache manager then stores these blocks in one set of the data buffers 48$a,b,c$ or N. In the case of a read request, the client cache manager transfers the requested block(s) to the application buffer 51, and in the case of a write request, the client cache manager fetches the data from the application buffer 51 and overwrites the respective data buffer.

In general, the token management process attempts to minimize future requests from the same client to the server as well as minimize disruption to other clients who currently hold tokens within the span of the current request. The token management process is based generally on the following strategy:

General Rules For Token Management

1. Except for a deadlock situation, the current requestor is always guaranteed to get the token for the first data block specified by the command processor.
2. If there is no contention (i.e. in case of a read request, no other client currently owns a write token for any of the eight data blocks requested by the command processor or in the case of a write request, no other client currently owns a read or write token for any of the eight data blocks requested by the command processor), then tokens for all blocks requested by the command processor are awarded. If there is no contention for the first "K" blocks where "K" is less than eight, but there is contention for the "K+1" block then the requesting client will receive tokens for the first "K" blocks.
3. Callbacks are never issued to clients that do not also have the token for the first block in the request from the command processor.
4. If another client currently holds the token for the first block requested by the command processor and either the current request is for write or this other client has the token for write, then the token manager issues a call back for the first block and all other consecutive blocks held by this other client, except (a) callbacks are never issued to clients that do not also have the token for the first block in the request from the command processor and (b) if the client which holds the token for the first block also holds tokens for consecutive blocks therefrom including a block held by another client which does not also hold the token for the first block and all intervening blocks, the client which holds the token for the first block and consecutive blocks therefrom is issued a call back, but this client keeps and is not called back for the token for the same block as held by the other client and subsequent blocks therefrom. If a client holds contending tokens for a string of blocks beginning with the first requested block, these tokens number fewer than the number requested, and there are no other contending tokens in the number requested, then all requested tokens are awarded.

If the client application requests more than eight blocks or it does not get back all blocks requested with the initial request to the server, then the client cache manager may issue multiple server requests to encompass the entire client application request. Each request is handled separately according to the general rules described above.

In accordance with the objects of the present invention, the foregoing token management process minimizes the frequency at which the client must make a request to the server while minimizing disruption to other clients, i.e. call backs.

Figure 4B:
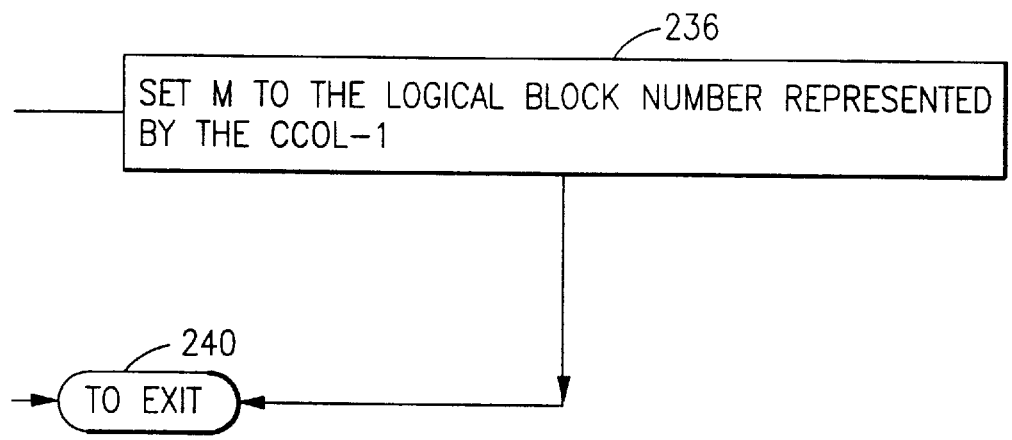
FIGS. 4(a)a, 4(a)b, 4(b)b, 4(b)c, 4(b)d, 4(c)b, 4(c)c, and 4(c)d represent is a flow chart of a process implemented by a token manager within the server of FIG. 1.
Figure 4C:
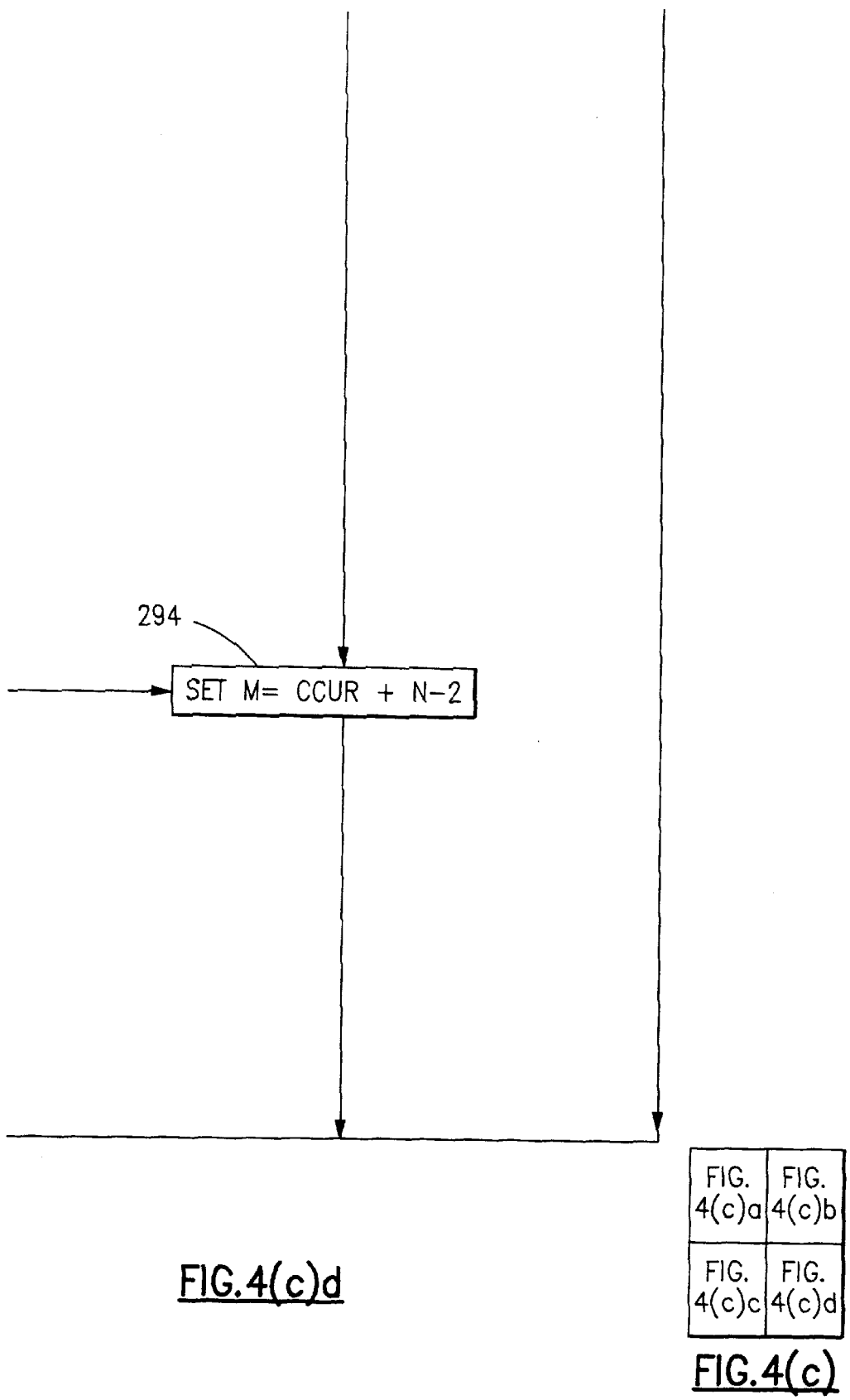

The following specific rules describe the foregoing token management process in more detail:

These rules are computer implemented (having been loaded as object code from a magnetic disk or tape into the computer) according to the flowchart of FIGS. 4($a$)$a$, 4($a$)$b$, 4($b$)$a$, 4($b$)$b$, 4($b$)$c$, 4($b$)$d$, 4($c$)$a$, 4($c$)$b$, 4($c$)$c$, and 4($c$)$d$ and utilize as input a two dimensional array based on the specific request. Successive columns of the array represent successive blocks requested by the client, i.e. the first column represents the first block requested by the client, the second column represents the second block requested by the client, . . . and column M represents the last block requested by the client. (In the illustrated embodiment, the clients request eight blocks so there are eight columns.) The blocks are labeled based on their relation to the beginning of the file, for example, fifth block of file, sixth block of file, etc. Each element of the array contains information that indicates the type of token held—read or write, and an identification of the client that holds the token. A zero value in the array indicates no holder of a token; it is just a "filler" in a row.

For a read request, the array lists write tokens but does not list outstanding read tokens because read tokens do not contend with the request. Because there can be at most one write token for any one block, there will only be a single row in the array for a read request. However, for a write request, the array lists both read and write tokens because both read and write tokens contend with the write request. Because there can be multiple concurrent readers of the same block there can be multiple rows in the array generated for the write request.

The array comes filled for the current request with holders of blocks n through m where n is the first block number requested and m is the last block number requested. The token management process uses m as an input. When the token management process determines that less than all blocks requested are to be granted to the requestor (effective blocks less than requested blocks), the token management process modifies m to represent the effective last block number allowed and m is returned as output of the token management process to indicate the effective last block awarded. Column M can be determined as follows: M=m−n+1.

One main function of the token management process is to determine how many sequential tokens beginning with the first requested block to award upon request by a client. FIGS. 4(a)a, 4(a)b, 4(b)a, 4(b)b, 4(b)c, 4(b)d, 4(c)a, 4(c)b, 4(c)c, and 4(c)d provide a detailed flow of the token management process. The token management process begins with decision 200 which determines whether the current request is for read mode block tokens or write mode block tokens. In the case of read mode, decision 202 determines if the first requested block is held in a contending mode, i.e. write mode by any client. If this is true, step 204 scans across the array from column 2 to higher columns to determine if the holder of the column 1 write mode token holds subsequent, consecutive write mode tokens. To accomplish this, for each array element of the scan (where "CCOL" is the current column in the scan), step 204 and decision 206 determine if the client represented by the current element is not the same as the client represented by the column 1 element (who holds a write token for the first requested block), and, if so sets m to the logical block number represented by CCOL-1 (step 208) and terminates the scan by going to step 216. As noted above by the fourth general rule, the call back will encompass the first requested block and other consecutive blocks held by the same client who holds the token for the first consecutive block but will not call back a block token held by another client who does not hold the token for the first block.

Referring back to decision 202, if column 1 contains a zero element (i.e. no client holds a contending write token for the first block requested), the token management process continues with step 210 and decision 212 which scan columns 2 through M to test, for each column of the scan, whether CCOL contains a non-zero (write-mode contending) element. When a column contains a nonzero element, step 210 sets m to the logical block number that is associated with CCOL-1 (step 214). This implements the second general rule that if there is no contention for the first "K" blocks where "K" is less than eight, but there is contention for the "K+1" block then the requesting client will receive tokens for the first "K" blocks. However, if there is no contention for any of the first eight blocks, then all blocks are awarded to the requesting client.

Referring back to decision 200, if the request is not for read mode block tokens, then the token management process continues with decision 216 to determine if the current request is for write mode block tokens. If not, this instance of the token management process is complete and exits 217. However, if the current request is for write mode tokens, the token management process continues with decision 218 to determine if no callback is required for the first requested block, i.e. element A1=0 (no outstanding read or write mode tokens in the first column). If no callback is required, step 220 of the token management process scans for the first contention (i.e. the first column that contains a nonzero entry). If no nonzero entries are found, then there is no contention and "m" is unchanged, i.e. m retains its initial value, that of the highest block number requested. This implements the second general rule whereby all requested blocks are awarded absent contention. However, if a nonzero entry is found in any column after the first, decision 222 proceeds to step 224 to set "m" equal to the column number containing the first contention minus one and then exits 225. This also implements the second general rule that sequential requested blocks are awarded until a contending block is encountered.

However, if decision 218 was negative, i.e. there is an outstanding token for either read or write for the first requested block, the token management process continues with decision 230 to determine if the outstanding token for the first requested element is write m ode. If so, the token management process continues with step 232 and decision 234 to scan columns 2 through M until finding a token held by a client different than the client that holds the token for the first requested block or finding all zero entries for a column. Upon either condition, step 236 sets m to the logical block number represented by the CCOL-1 and then exits 241. Thus, in accordance with the fourth general rule, the callbacks will encompass all the write mode tokens held by the client that holds the write mode token for the first block. (However, the actual award will go further if there is no contention beyond this string.) If neither condition is met, "m" is not changed from its original value.

Referring again to decision 230, if the token for the first requested block is currently held for read mode, then the token management process continues with step 242. The next task of the token management process is to determine the longest string of consecutive read mode tokens that are held in common by all holders o f the first requested block. Step 242 first initializes a variable "MAX" equal to 0 and another variable "MIN" equal to 0. Then, a SCAN1 function (step 242) scans all column one elements and for each column one element it sets variable HIGH equal to the highest block number in the consecutive range that is held by the client represented by the current scan element. Then, for each element, step 244 determines if MAX=0 and, if so, step 248 sets MAX to the value in HIGH and sets CMAX to the column associated with HIGH; otherwise (MAX is not equal to zero and) step 246 determines if HIGH is less than MAX, and also executes step 248. In any case, the scan continues to the end (step 250) and then goes to step 252.

Decision 252 determines if the current value of MAX is not equal to "n", the relative block number of the first column, in which case, at least one client holds a read mode token for the second requested block. In accordance with the fourth general rule, all the requested blocks are not awarded if another client holds a token for one of these consecutive blocks but does not also hold the token for the first requested block. Therefore, the token management process now scans (SCAN2) for such "spoilers". Thus, step 254, step 258 and decision 260 compare the elements in each "current" column CCOL, two through CMAX, to determine if the client who holds a token in the current column does not also hold a token for the first requested block. If this condition is met, MIN is set to the relative block number that is one less than the one represented by CCOL, and CMIN is set to the CCOL-1 (step 262). Next, decision 264 passes to step 266 to set m to the MIN value and the scan is terminated. Otherwise the scan continues to the end (256, 268).

The token management process continues with decision 270 from a failure of the test in 252 or from completion of SCAN2 (step 266 or decision 264). The next function implements the general rule that all the consecutive blocks up to m are awarded as long as no clients hold the token (second general rule) or as long as the token is held by a client that also holds the first requested block, while no other client (ones that do not have the first requested block) holds a requested token (third general rule). The remaining SCAN3, SCAN4 and SCAN5 (steps 272, 276 and 290, respectively) complete this rule enforcement. These scans begin with the column just after the one where SCAN2 left off (CMIN+1). If decision 270 determines that MIN equals 0 and MAX does not equal m (either did not go through SCAN2 or went through it without finding spoiler(s)), a SCAN3 function is executed (step 272). This scan begins with the column after CMIN and continues to the column that represents relative block number m (M). As noted above, it continues as long as:

1. there are consecutive READ mode block tokens found or consecutive absence of tokens for clients that also have a READ block token for the first requested block, and 2. there are no tokens found for clients which do not also hold a token for the first requested block.

Step 272 initializes a flag, CONSECSTOP to equal zero. This flag is stored in each column 1 element. Then, step 272 scans columns CMIN+1 through column M (the current column in this scan being abbreviated as "CCUR"). Then for each column there is another scan (SCAN4), which scans all elements in column 1 (step 276). For each element in SCAN4, decision 278 determines if the client represented by the current element is not also represented by an element in column CCUR or if CCUR contains only 0 elements, and if so, sets the CONSECSTOP flag ON in the current element (step 280) and continues the scan (decision 286). Step 280 is executed when finding that the holder of a token for column 1 block is not also represented by an element in column CCUR or CCUR contains only zero elements. Consequently, the token management process must remember this condition for that client because the condition will terminate SCAN3 when/if there is a block held by the same client in a subsequent column.

If decision 278 fails, the token management process continues with decision 282 to determine if the mode of the matching column CCUR element is write, and if so, sets m=CCUR+n−2 and proceeds to exit 298. Otherwise, the token management process continues with decision 284 to determine if the CONSECSTOP flag in the current element is ON (results from an intervening empty slot for a client) and if so, sets m=CCUR+n−2 and exits 298.

If SCAN4 ends without any such exits, then SCAN5 is executed (step 290). The purpose of SCAN5 is to detect the case where a spoiler is a client that does not hold a block in column 1. SCAN5 scan s elements in column CCUR but avoids this scan if all CCUR elements are 0 (decision 288). If CCUR contains non-zero elements, decision 292 tests if the client represented by the current element is not also represented by an element in column 1, and, if so, set m=CCUR+n−2 (step 294) and exits 298.

The following are applications of these rules when applied to specific examples. In these examples, the intent of the client request and the nature of an outstanding token are indicated by "W" for write or "R" for read. Callbacks are abbreviated as "CB" and awards are abbreviated as "AW". The scopes of requests, callbacks and awards are expressed as X(Y) where X is the first logical block in the request, callback or award and Y is the total number of blocks beginning from the first logical block that are included in the request, callback or award. "A" is the requestor and "B", "C", and "D" are current holders of tokens.

Referring back to FIG. 3, after step 75 or 80 is complete, the client cache manager receives the awarded data blocks from the server and stores them in the buffer (step 335). Then, after affirmative decisions 73 and 76, the client completes the read or write operation for the requesting application.

Satisfaction from Existing Data in Buffer

Referring a gain to decision 73, if the data buffers contain the request ed data block(s), the client cache manager then determines if the client already has the proper type (read or write mode) of token for the requested operation (decision 76). In the case of a read request, a read or write token is sufficient. In the case of a write request, only a write token is sufficient. If the data currently resides in the data buffer and the client currently has the proper token, then in the case of a read request, the command processor supplies the data to the application buffer and in the case of a write request, the command processor writes the data from the application's buffer to the client cache manager data buffer (step 78).

However, in the case of a write request where the client does not currently have the proper token, the client cache manager sends a request to the server for the write token for all blocks in the buffer that need upgrading (but does not request the actual data because there is no need) (step 80). The range of blocks that need upgrading starts with the first block in the buffer where data will be written, and extends to the next write token in the buffer, if any. The request manager 22 receives the token "upgrade" request from the client and routes it to the file block manager 28. The file block manager realizes that a token upgrade is required and then passes the request to the token manager 30 to obtain a write token. The token manager 30 makes the final decision as to which tokens to award. This is based on the same analysis described above (FIGS. 4(*a*)*a*, 4(*a*)*b*, 4(*b*)*a*, 4(*b*)*b*, 4(*b*)*c*, 4(*b*)*d*, 4(*c*)*a*, 4(*c*)*b*, 4(*c*)*c*, and 4(*c*)*d*) for the request for the actual data block and associated tokens. Thus, as noted above, the token manager 30 analyzes the nature (read or write) of the request, which tokens/blocks within the span of the request are currently checked-out to other clients, and the nature of the tokens currently checked-out to the other clients. After determining which token upgrade to award, the token manager issues the call backs, if any, required to support the award of these write tokens to the client. Then, the token manager 30 notifies the file block manager 28 of the award of tokens to the client, and the file block manager passes the notification to the request manager which passes the award to the client. Then, the client updates the data buffer to indicate that the write tokens are now associated with respective blocks in the buffer. Then, the client cache manager writes the data from the application buffer to the corresponding data buffer.

Collateral Optimizations

1. Block Write Without Reading Blocks: This optimization awards the tokens but avoid the data transfer from the server to the client when it is known that a write of the entire block will follow and such a write does not depend on the previous contents of the data blocks. In this case the request manager calls the token manager but not the file block manager. This has substantial savings in I/O and processing by the server, along with savings in communications for the data transfer.

2. Data Block Read Without Token Award: This optimization avoids awarding a token for a read operation, but still transfers the data block. The request manager still calls the token manager as normal, but with a provision not to award the token to the requesting client cache manager. If there is contention for the tokens, there will be normal callbacks, even though the called back token(s) are not re-awarded. This optimization not to cache data blocks saves future callbacks to the requestor in situations where it is known that there will be no need to cache for future reference by the requestor (i.e. one time operations).

3. Callback Coordination and Avoidance of Sliver Conditions: Sliver conditions involving the arrival of callbacks and either the later arrival of token awards or the voluntary relinquishment of the corresponding tokens are resolved by:

maintaining outstanding callback record by the Token Manager (for each client cache manager).

allowing for callback response from a client cache manager that indicates "not found" or "partial not found". The latter allows for specification of what part of the callback was found (and therefore is satisfied), the implicit remainder being not found.

when the token manager gets a "not found" response for a callback, it will record the return of tokens that were found (partial not found case); then check to see if remaining tokens are still outstanding (they may have been returned voluntarily ahead of the callback response).

when a "not found" response arrives without the above resolution, the token manager initiates a retry of the callback. Such retries are repeated a sufficient number of times to normally expect resolution of sliver conditions such as late arrival of the original token award.

when a reasonable number of callback retries have completed, the token manager assumes the condition is not going to resolve normally, and forces the callback to be processed as complete anyway, taking the token from the callback target and awarding it the request that is waiting for it.

for the last retry callback before thus giving up, the server sets a flag in the callback message to warn the client cache manager so that the client cache manager can purge its cache and begin its caching from scratch for the subject file. Along with this would be automatic rejection of any late arriving tokens for the file.

the server uses the token manager to recheck that the client cache manager for certain requests is still in possession of the required tokens before processing the requests (token enforcement check), in case those tokens have been subject to forced callback completion as described above.

the token manager function for posting callback token returns and for posting new tokens awarded is designed to allow for cases where the post operation is unnecessary (token already posted) which prevents unnecessary failures involving the arrival of the post and retry/timeout overrides. This allowance for "already posted" means that it handles duplicate decremental posts, such as when a token is returned voluntarily, then called back, yielding a not found response repeatedly from the target client cache manager until the Token Manager gives up and forces removal of the token from the target client cache manager. It also means that it handles duplicate incremental posts, such as when the token manager is asked to award a token to a client cache manager, but the client cache manager already has the token. This post function also handles partial posts, and propagates balances for partial situations, such as when part of a block range has been posted as returned, but there remains a balance that is still outstanding.

When there is an unusual delay in the client or in the server such as to cause a long delay in responding to a callback, the token manager times out on the callback wait. In unusual cases where this does not resolve the matter, the token management process completes and returns to the requesting client and its application with an indication that the target file is busy. This allows the application to retry the file access at a later time.

4. Insuring Atomicity of Application Requests: In order to prevent loss of tokens that are required by an application function (e.g. through callbacks) the client cache manager freezes them against callbacks until the application request completes. One application request may require several server requests to satisfy it. For example, an application request involve reading data blocks, changing them, and updating them in one step. This may involve several trips to the server to get the tokens/blocks transferred to the client cache manager, update them, and write back the changes. This atomicity is accomplished by marking the associated meta data (or "object token") for the file to protect against its loss to asynchronous callback processing that operates as another task in the same client. The object token represents the metadata for the object and gives the holder read or write mode control of the object, relative to serialization of object operations. An object token thus marked cannot be called back until it is unmarked (at the completion of the current atomic operation). Block tokens for the same file are also protected against deadlocks by the rule that they cannot be called back if the object token for the same file has been marked as frozen to callbacks.

5. Deadlock Prevention for Callback Processing: A file level latch in the server insures that only a single server task can initiate callbacks for tokens that are associated with a particular file. These callbacks must be completed before another server task can initiate callbacks for that same file. Otherwise deadlocks could occur, for example, when:

CCM A wants block 4   CCM A holds block 5
   in File X              in File X
while
CCM B wants block 5   CCM B holds block 4
   in File X              in File X where "CCM" means client cache manager.

By serializing callbacks on a file basis, it also greatly simplifies generation of the callbacks without concern for the picture changing dynamically before the callbacks are completed.

There is one exception to this serialization on file callbacks. Because of the above requirement for atomicity for application requests that involve multiple trips to the server (for example where the number of data blocks exceed the buffering capacity of the CCM), there is provision for the second and subsequent block read requests to the server to be processed concurrently with another initial request against the same file. This is accomplished with two latches: CBI (callback initial) and CBC (callback continue). This works in conjunction with the freezing of object token callbacks by the client cache manager as described above (under the atomicity solution) as follows:

Client A processes an application request that requires reading enough blocks that more than one trip to the server is required. It either already had the object token for the file (file X) or it gets it at the same time that it gets the initial buffer load of data blocks and their tokens:

a. Client A goes to the server with the initial request. It causes CBI to be latched while calling back any required tokens etc., but this latch is released when the request to the server is completed.

b. Client A gets the response to this request and freezes the object token (if not already done) against callbacks because it needs another trip to the server to complete the application request.

c. Client B tries to read blocks from the same file (X), goes to the server, and also uses the CBI latch. In this case the CBI latch is held while there is an outstanding callback to Client A for the object token (and also possibly some associated blocks).

d. The callback to Client A is held up by the freezing of the object token against callbacks in Client A and this hold up continues until the end of step f below.

e. Client A sends a second request to the server for additional File X blocks in satisfaction of the original request. The server knows, because the request is flagged as such, that this is not an initial request, but a continuation request so it does not try for the CBI latch (still held by the task serving Client B), but latches CBC instead. CBC is held until callbacks for the additional blocks are complete.

f. At the completion of the callbacks, the CBC latch is released and the response is sent back to Client A. Client A completes the application request and releases the freeze on the object token in the client's environment, allowing the callback on behalf of Client B to complete (which will result in the CBI latch release in the server).

The two latches along with freezing object tokens from callbacks in the client work together to restrict concurrency while permitting continuation requests from the holder of the object token to complete. The CBI latch acts to serialize callback for the file while the CBC latch acts to provide an exception path around the CBI blockage for the continuation requirement. Because of object token freezing, we know that the client who is continuing with the second request is going to be able to get the CBC latch.

Another example involves several clients which have established concurrent and continuous read operations, holding object read mode tokens for File Y, and having frozen them against callbacks. If yet another client requires a object token in write mode for the same file (Y) (tries to callback all of the object read tokens), it will hold the CBI latch and be stopped in its callback attempts by all of the clients holding and freezing their read mode object tokens. But meantime, each of the read mode object token holders can continue to get additional blocks using the CBC path (serially).

6. Metadata Token Retention and Downgrade on Close: By default all metadata and block tokens are deleted when the client closes the associated file. However, the token manager permits an option for either retaining or downgrading (from write mode to read mode) a metadata for a file when the file is closed. This allows the client cache manager to avoid token reacquisition in cases where it is known or expected that the file will be reopened.

7. No-response Callbacks: The token manager also provides for callbacks that do not require a response, called "token invalidations". Here the token manager assumes that the client cache manager will receive the invalidation and discard the invalidated token(s), but without a response. This is appropriate where the initiator of the callback does not have to know exactly when the token is discarded, i.e. it does not have to synchronize exactly on the time of relinquishing the token before it can continue with its current operation. An example is the invalidation of truncated data blocks. There is performance improvement and a savings of resources by avoiding the response requirement.

The protection against cases where the invalidation does not reach the target is basically the same as those discussed above under "Callback Coordination and Avoidance of Sliver Conditions", whereby relinquishing a token voluntarily when it has already assumed to be relinquished does not cause problems, where the server checks tokens before allowing their use, etc. Also, when a connection is lost to a client (a typical condition under which an invalidation might not reach its intended target), there is a clean up of outstanding tokens for that client on both sides of the connection.

Based on the foregoing, a computer system according to the present invention has been disclosed. However, numerous modifications and substitutions can be made without deviating from the scope of the present invention. For example, the number of buffers in the client cache manager and therefore the request size passed to the request manager can be some number of blocks other than eight. Also, if desired the client cache manager may specify to the server only the bytes required by the client application and the server determine the number of blocks to provide based on the foregoing process and some predetermined limit such as eight blocks. Therefore, the present invention has been disclosed by way of illustration and not limitation, and reference should be made to the following claims to determine the scope of the present invention.

We claim:

1. A token manager for a computer system wherein data blocks are represented by respective tokens, and an award of a token to a client represents access by the client to the respective block, said manager comprising:

means for receiving a request for at least one of multiple consecutive data blocks; and means, responsive to the request, for (a) awarding the token for a first data block specified in the request without interference due to contention for said first data block by a current owner of the token for said first data block; and (b) awarding tokens for all other consecutive blocks following said first block of said multiple blocks held by a client who also holds the token for said first block, except if another client currently holds a contending token for one of said consecutive blocks other than said first block but does not also hold the token for said first block, then awarding only the tokens for said first block and all blocks between said first block and said one block.

2. A token manager as set forth in claim 1 wherein the awarding means awards the tokens for all of said multiple consecutive blocks if there is no contention for said all of said multiple consecutive data blocks.

3. A token manager as set forth in claim 1 wherein the contending token is write mode but not read mode for a read request and the contending token is read or write mode for a write request.

4. A token manager as set forth in claim 1 wherein said request is to write to said multiplicity of data blocks.

5. A token manager as set forth in claim 1 wherein said request is to read said multiplicity of data blocks, and said other client currently holds a write token for said one block.

6. A token manager as set forth in claim 1 wherein the awarding means comprises means for calling back tokens from all other clients which currently hold tokens which are awarded pursuant to said request and contend with said request.

7. A token manager as set forth in claim 6 wherein, pursuant to said call backs, said all other clients return any updates that they have made and relinquish control of said blocks, after said all other clients complete their current atomic operations involving the respective blocks.

8. A token manager as set forth in claim 7 wherein the awarding means does not award a token for any contending block for which another client holds the token if said other client does not also hold the token for said first data block.

9. A token manager as set forth in claim 1 wherein the request was sent from a client for said multiple consecutive data blocks.

10. A token manager as set forth in claim 9 wherein an application in said client initiated a request for data contained within a first N of said multiplicity of blocks, wherein N is less than the number of blocks in said multiplicity, and said client generated said request for said multiplicity of blocks in response to the application request.

11. A token manager as set forth in claim 1 wherein, pursuant to said request, the awarding means issues a call back for said one block to any client which holds the token for said one block, and said one block is a first block of said multiple consecutive blocks.

12. A token manager as set forth in claim 1 wherein the awarding means does not award a token for another of said blocks in said multiple data blocks if yet another client holds a token for said other block and said first block but not all intervening blocks.

13. A server computer system for managing shared files, said system comprising:

a token manager comprising
means for receiving a request for multiple blocks of data; and
means, responsive to the request, for (a) awarding the token for a first data block specified in the request and (b) awarding tokens for all other consecutive blocks following said first block of said multiple blocks held by a client who also holds the token for said first block, except if another client currently holds a contending token for one of said consecutive blocks other than said first block but does not also hold the token for said first block, then awarding only the tokens for said first block and all blocks between said first block and said one block; and a file block manager which sends for read requests and receives for write requests all data blocks corresponding to the awarded tokens to the client which made the request.

14. A client/server computer system for managing shared files, said system comprising:

a token manager comprising
means for receiving a request for multiple blocks of data; and
means, responsive to the request, for (a) awarding the token for a first data block specified in the request without interference due to contention for said first data block by a current owner of the token for said first data block; and (b) awarding tokens for all other consecutive blocks following said first block of said multiple blocks held by a client who also holds the token for said first block, except if another client currently holds a contending token for one of said consecutive blocks other than said first block but does not also hold the token for said first block, then awarding only the tokens for said first block and all blocks between said first block and said one block; and at least one client comprising:
means for executing a client application that requests data from a shared file;
a data buffer;
means, pursuant to said request, for determining if said data is currently stored in said data buffer, and if so, granting said client access to said data in said buffer, and if not sending said request for multiple blocks of data, said multiple blocks of data including said data requested by said one client from said shared file.

15. A method for managing tokens in a computer system wherein data blocks are represented by respective tokens, and an award of a token to a client represents access by the client to the respective block, said manager comprising:

receiving a request for at least one of multiple consecutive data blocks; and in response to the request,
awarding the token for a first data block specified in the request,
determining if another client currently holds a contending token for said first data blocks, and if so, identifying consecutive contending tokens held by said other client; and
awarding tokens for other consecutive blocks following said first block of said multiple blocks held by said other client who also holds the token for said first block.

16. A method as set forth in claim 15 wherein the award of tokens for said other consecutive blocks does not include or continue beyond another contending token of another client who also holds a contending token for said first block but not for all intervening blocks.

17. A method as set forth in claim 15 wherein the award of tokens for said other consecutive blocks does not include or continue beyond another contending token of another client who does not hold a token for said first block.

18. A method as set forth in claim 15 wherein outstanding read and write tokens contend with a write request, and a write token but not a read token contends with a read request.

19. A method as set forth in claim 15 wherein a client requests said multiple consecutive blocks but does not currently need all of said multiple consecutive blocks, and store the blocks which are not currently needed in a cache buffer with the expectation that the client will next need said blocks which are not currently needed.

* * * * *